United States Patent [19]

Clark et al.

[11] Patent Number: 5,005,952
[45] Date of Patent: Apr. 9, 1991

[54] POLARIZATION CONTROLLER

[75] Inventors: Michael G. Clark, Buckinghamshire; Ifor D. W. Samuel, Surrey, both of England

[73] Assignee: The General Electric Company, p.l.c., England

[21] Appl. No.: 264,952

[22] PCT Filed: Feb. 18, 1988

[86] PCT No.: PCT/GB88/00105
§ 371 Date: Dec. 14, 1988
§ 102(e) Date: Dec. 14, 1988

[87] PCT Pub. No.: WO88/06303
PCT Pub. Date: Aug. 25, 1988

[30] Foreign Application Priority Data

Feb. 18, 1987 [GB] United Kingdom ............ 8703795

[51] Int. Cl.⁵ ............................................. G02F 1/13
[52] U.S. Cl. ................................... 350/335; 350/332; 350/347 E; 350/352; 350/403
[58] Field of Search .................... 350/335, 340, 347 E, 350/400, 403, 347 R, 374, 388, 332, 352

[56] References Cited

U.S. PATENT DOCUMENTS

| | | | |
|---|---|---|---|
| 3,558,214 | 1/1971 | de Lang et al. | 350/388 |
| 3,558,215 | 1/1971 | de Lang et al. | 350/388 |
| 3,753,608 | 8/1973 | Bernal | 350/403 |
| 3,890,628 | 6/1975 | Gurtler | 354/227 |
| 3,956,626 | 5/1976 | Ross | 350/388 |
| 4,394,069 | 7/1983 | Kaye | 350/347 E |
| 4,443,065 | 4/1984 | Funada et al. | 350/335 |
| 4,466,702 | 8/1984 | Wiener-Avnear et al. | 350/335 X |

FOREIGN PATENT DOCUMENTS

| | | |
|---|---|---|
| 0123488 | 10/1984 | European Pat. Off. . |
| 0209439 | 2/1986 | European Pat. Off. . |
| 0198245 | 10/1986 | European Pat. Off. . |
| 58-34429 | 2/1983 | Japan . |
| 8203467 | 10/1982 | PCT Int'l Appl. . |
| 8203468 | 10/1982 | PCT Int'l Appl. . |
| 1185970 | 4/1970 | United Kingdom . |
| 1245760 | 9/1971 | United Kingdom . |
| 1248752 | 10/1971 | United Kingdom . |
| 1350266 | 4/1974 | United Kingdom . |
| 2184251 | 6/1987 | United Kingdom . |

OTHER PUBLICATIONS

Bruno Rossi, *Optics*, Addison-Wesley, 1957 pp. 269-291.
"Polarization-State Control Schemes for Heterodyne or Homodyne Optical Fiber Communications", by Takanori Okoshi, in Journal of Lightwave Technology, vol. LT-3, No. 6, Dec. 1985, pp. 1232-1236.

*Primary Examiner*—Stanley D. Miller
*Assistant Examiner*—Anita Pellman Gross
*Attorney, Agent, or Firm*—Kirschstein, Ottinger, Israel & Schiffmiller

[57] ABSTRACT

A polarization controller comprises at least one stack of nematic liquid crystal cells arranged such that radiation incident on the stack will pass through each cell in the stack in sequence. Synchronized electric or magnetic fields are applied across the cells so as to change the phase retardation of the radiation transmitted through each cell by a chosen amount, the optical axes of the cells being oriented with respect to each other such that the polarization of radiation incident on the controller is caused by the controller to change from a first state to a second state.

7 Claims, 3 Drawing Sheets

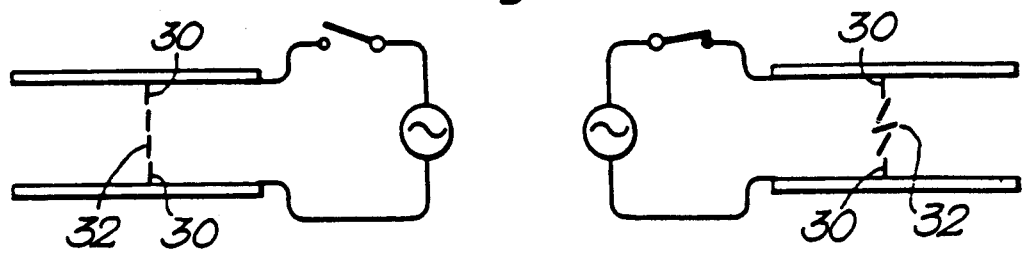
Fig.5.
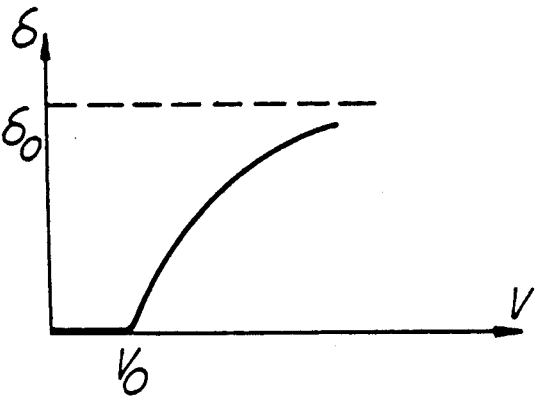
Fig.6.
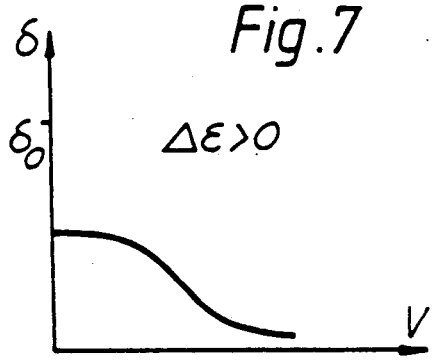
Fig.7. $\Delta\varepsilon > 0$
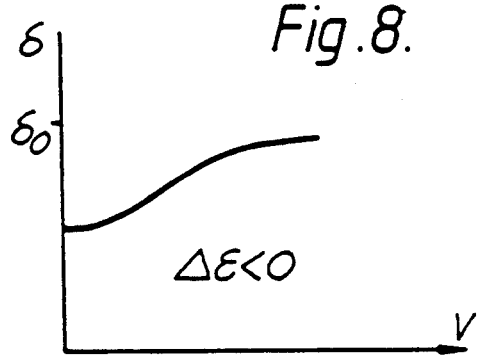
Fig.8. $\Delta\varepsilon < 0$
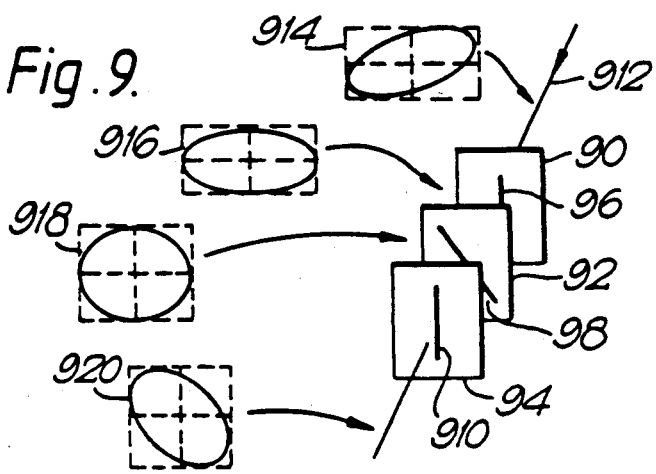
Fig.9.

POLARIZATION CONTROLLER

BACKGROUND OF THE INVENTION

1. Field of the Invention

This invention relates to polarisation controllers.

2. Description of Related Art

Polarisation controllers are used in optical communication systems utilising monomode optical fibres. In such systems, in order to enhance the receiver sensitivity compared to the direct detection methods used at present in optical fibre systems, it is desirable to use coherent detection techniques. Such techniques however require the matching of the state of polarisation of the optical signal at the output of the transmission fibre to that of the local oscillator beam at the receiver. The problem arises for long lengths of optical fibres, i.e. kilometres, that the state of polarisation of the light emerging from the fibre will vary with time due to the inherent birefringence of the fibre, defects and strains either inherent or introduced by bending etc. of the fibre, temperature and pressure changes along the length of the fibre etc.

Thus, for example, a linear polarised input beam will emerge from the fibre with elliptical polarisation.

Polarisation controllers must therefore be used in such systems in order to match the state of polarisation of the output and local oscillator beams. A number of polarisation controllers have been proposed over the years, a review of such controllers being given in Journal of Lightwave Technology, volume LT-3, No. 6 published in December 1985. These include electromagnetic fibre squeezers, rotatable fibre coils, Faraday rotators, electro-optic crystals, phase plates and rotatable fibre cranks. All these proposed polarisation controllers suffer from disadvantages, however, the fibre squeezers, 1 rotatable fibre coils, Faraday rotators and electro-optic crystals not being capable of coping with endless, unbounded variations in the state of polarisation, whilst the phase plates and rotatable fibre cranks suffer from a slow temporal response. Whilst electro-optic crystals, for example pairs of lithium niobate crystals, have been used in practical systems, these suffer from the additional disadvantage of high operating voltages, typically 160 to 260 volts, and the long optical path length through the crystals leading to high insertion losses of typically 3 to 6 dB.

SUMMARY OF THE INVENTION

It is an object of the present invention to provide a polarisation controller suitable for use in an optical communication system wherein some of the disadvantages inherent in previously proposed polarisation controllers are at least alleviated.

According to a first aspect of the present invention a polarisation controller comprises at least one stack of nematic liquid crystal cells arranged such that radiation incident on the stack will pass through each cell in the stack in sequence; and means for applying synchronised fields across the cells so as to change the phase retardation of the radiation transmitted through each cell by a chosen amount, the optical axes of the cells being oriented with respect to each other such that the polarisation of radiation incident on the controller is caused by the controller to change from a first state to a second predetermined state.

According to a second aspect of the present invention a polarisation controller for converting the polarisation state of incident radiation of a first arbitrary polarisation state to a second arbitrary polarisation state comprises a stack of three nematic liquid crystal cells arranged such that the incident radiation will pass through the cells in sequence, the slow axes of the first and last cells within the stack being either parallel or perpendicular to each other, the slow axis of the intermediate cell being inclined at 45° to the slow axis of the first cell; and means for applying synchronised fields across said cells so as to produce the required polarisation conversion.

According to a third aspect of the present invention a polarisation controller for converting the polarisation state of incident radiation the polarisation of which is continuously varying to a predetermined state, comprises two stacks of nematic liquid crystal cells constituting two alternative optical paths, the cells within each stack being arranged such that the radiation incident on the stack will pass through each cell in sequence; and means for varying both the proportions of said incident radiation passing along each path and the phase retardation produced by each stack in a periodic manner.

According to a fourth aspect of the present invention a polarisation controller for converting the polarisation state of incident radiation the polarisation of which is continuously varying to a predetermined state, comprises a stack of four nematic liquid crystal cells arranged such that the incident radiation will pass through the cells in sequence, the slow axes of the first and third cells within the stack being either parallel or perpendicular to each other, the slow axes of the second and fourth cells being inclined at an angle of substantially ±45° to the slow axis of the first cell; and means for applying synchronised fields across said cells so as to produce the required polarisation conversion.

BRIEF DESCRIPTION OF THE DRAWINGS

Four polarisation controllers in accordance with the invention will now be described, by way of example only, with reference to the accompanying drawings in which:

FIG. 5 illustrates a second example of a particular liquid crystal cell configuration which may be used in the controller shown in FIG. 1;

FIG. 6 illustrates the variation of the phase retardation produced by the cell of FIG. 5 with applied electric field;

FIG. 7 illustrates the variation of the phase retardation produced by a third liquid crystal cell configuration which may be used in the controller shown in FIG. 1 with applied electric field, where the liquid crystal within the cell has a positive dielectric anisotropy;

FIG. 8 corresponds to FIG. 7 where the liquid crystal within the cell has a negative dielectric anisotropy;

FIG. 9 is a schematic diagram of the second controller;

DETAILED DESCRIPTION OF THE PREFERRED EMBODIMENTS

Figure 1:
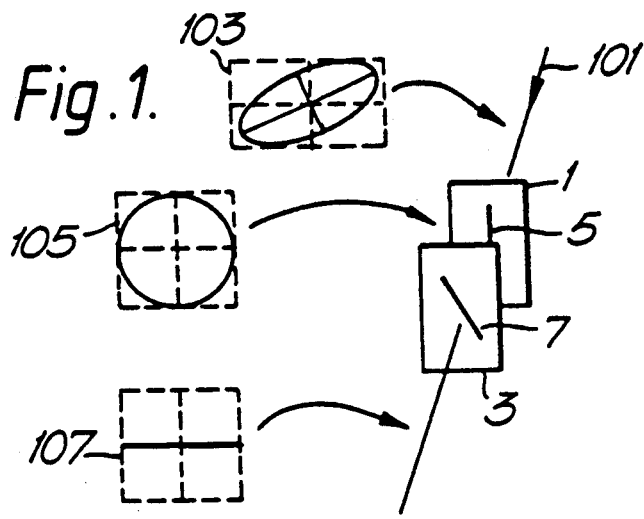
FIG. 1 is a schematic diagram of the first controller.
Figure 2:
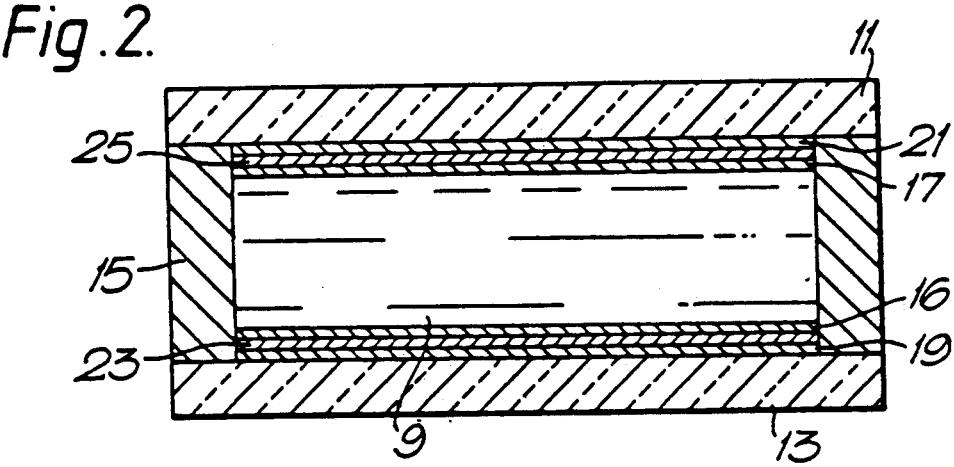
FIG. 2 is a schematic diagram illustrating the form of a liquid crystal cell within the first controller.
Figure 3:
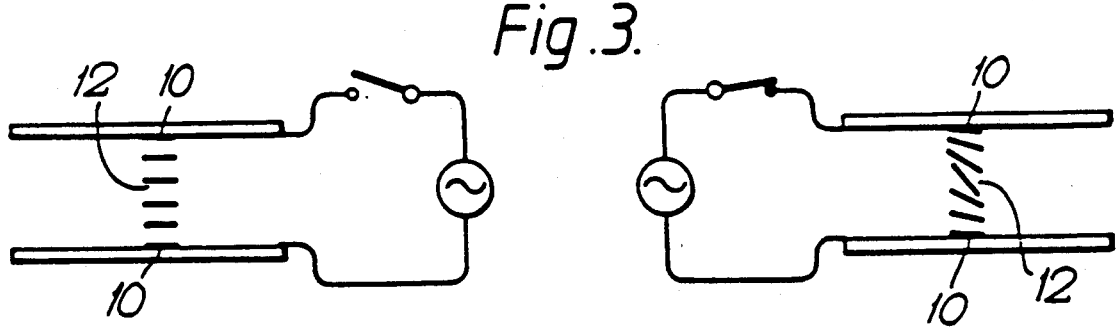
FIG. 3 illustrates a first example of a liquid crystal cell configuration which may be used in the controller shown in FIG. 1.
Figure 4:
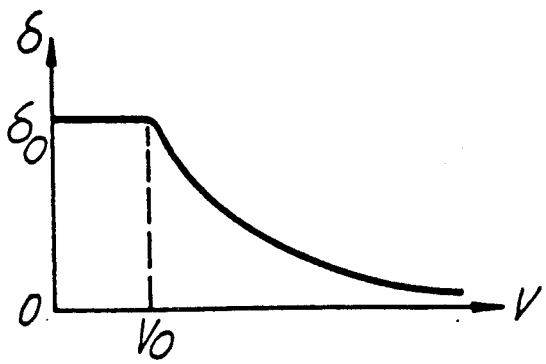
FIG. 4 illustrates the variation of the phase retardation produced by the cell configuration of FIG. 3 with applied electric field.

Referring firstly to FIG. 1, the first controller to be described, which is designed to convert incident radiation of arbitrary elliptical polarisation into linear polarisation of known azimuth, or vice versa, comprises a stack of two liquid crystal cells 1, 3, these cells being arranged with their slow axes 5, 7, i.e. polarisation direction of the extraordinary ray within the cell, set at 45°. Referring now also to FIG. 2, each cell 1, 3 comprises a sandwich comprising a nematic liquid crystal film 9 confined between two plates 11, 13 of glass, the nematic film being typically between 5 μm and 10 μm thick. The plates 11, 13 are spaced from each other and sealed by a seal 15 incorporating spacer particles of glass or carbon fibres. The two plates 11, 13 each carry on their inner surface a respective thin transparent electrode 16, 17, generally formed from indium tin oxide, respective barrier layers of $SiO_2$ 19, 21 being interposed between each plate 11, 13 and the corresponding electrode 16, 17 so as to prevent migration of sodium ions from the glass plates into the liquid crystal film 9. On the inner surface of each electrode 16, 17 there are formed respective thin alignment layers 23, 25. These layers cause the optic axis of the liquid crystal to align parallel to, or tilted at a small angle to, the plates 11, 13, i.e. they cause the crystal to adopt a homogeneous alignment. The tilted arrangement is preferred since it resolves a degeneracy which might otherwise cause formation of domains when an electric field is applied across the cell. Suitable alignment layers include rubbed polymer surfaces which impart a tilt of typically 2°, or obliquely evaporated silicon monoxide films which impart either zero tilt or a tilt of, typically, about 30°, according to the geometry of the evaporation. Referring now also to FIGS. 3 and 4, the cell is assembled with the alignment directions, 10, antiparallel so that in the absence of an applied voltage the optic axis 12 in the bulk of the liquid 9 adopts uniform configuration throughout the cell. If the liquid crystal has a positive dielectric anisotropy, on application of an AC voltage to the cell the configuration of the optic axis will become distorted as shown in FIG. 3. As a result, the phase retardation between ordinary and extraordinary rays transmitted normally through the birefringent cell will vary with RMS applied voltage V as shown in FIG. 4.

Referring now again primarily to FIG. 1, in operation of the controller to convert arbitrary polarisation to linear, a beam of incident light 101 enters the cell 1 with arbitrary polarisation, shown in FIG. 1 by the elliptical representation 103. The voltage applied to the cell 1 via the electrodes 16, 17 is chosen so that both the azimuth and ellipticity of the polarisation are changed, with the principal axes of the ellipse, 105, parallel and perpendicular to the slow axis 5 of the cell 1 as represented by the elliptical representation 105. The voltage on the second cell 3 is then set so that the light emerging from the stack is linearly polarised as shown in the representation 107. The electronic feedback circuitry required for this purpose is not shown but will be evident to those skilled in the art of polarisation controllers.

The mathematical algorithms for the phase retardations required of the cells 1, 3 are given below:

The polarisation control algorithms are given in Jones matrix formalism with arbitrary polarisation represented by the Jones vector $$\begin{pmatrix} \cos\theta \cos\epsilon - i\sin\theta \sin\epsilon \\ \sin\theta \cos\epsilon + i\cos\theta \sin\epsilon \end{pmatrix} \quad (A.1)$$

where $\theta, \epsilon$ are the azimuth and ellipticity angles, respectively. Premultiplying phase factors are never given explicity. When, in the course of a calculation, the phase factor changes this is denoted by use of an equivalence symbol, ≡, in place of the equals sign.

(A) Cell 1

Let the Jones matrix of cell 1 be written $$\begin{pmatrix} e^{i\phi_1} & 0 \\ 0 & e^{i\phi_2} \end{pmatrix} \quad (A.2)$$

Then the output is $$\begin{pmatrix} e^{i\phi_1} & 0 \\ 0 & e^{i\phi_2} \end{pmatrix} \begin{pmatrix} \cos\theta \cos\epsilon - i\sin\theta \sin\epsilon \\ \sin\theta \cos\epsilon + i\cos\theta \sin\epsilon \end{pmatrix}$$

$$= \begin{pmatrix} e^{i\phi_1} & 0 \\ 0 & e^{i\phi_2} \end{pmatrix} \begin{pmatrix} \cos\theta & -\sin\theta \\ \sin\theta & \cos\theta \end{pmatrix} \begin{pmatrix} \cos\epsilon \\ i\sin\epsilon \end{pmatrix} \quad (A.3)$$

$$= \begin{pmatrix} e^{i\phi_1} & 0 \\ 0 & e^{i\phi_2} \end{pmatrix} \begin{pmatrix} \cos\theta & -\sin\theta \\ \sin\theta & \cos\theta \end{pmatrix} \begin{pmatrix} 1 & 0 \\ 0 & i \end{pmatrix} \begin{pmatrix} \cos\epsilon \\ \sin\epsilon \end{pmatrix} \quad (A.4)$$

$$= \begin{pmatrix} e^{i\phi_1}\cos\theta & -e^{i\phi_1}\sin\theta \\ e^{i\phi_2}\sin\theta & e^{i\phi_2}\cos\theta \end{pmatrix} \begin{pmatrix} 1 & 0 \\ 0 & i \end{pmatrix} \begin{pmatrix} \cos\epsilon \\ \sin\epsilon \end{pmatrix} \quad (A.5)$$

$$= \begin{pmatrix} e^{i\phi_1}\cos\theta & -ie^{i\phi_1}\sin\theta \\ e^{i\phi_2}\sin\theta & ie^{i\phi_2}\cos\theta \end{pmatrix} \begin{pmatrix} \cos\epsilon \\ \sin\epsilon \end{pmatrix} \quad (A.6)$$

$$= \begin{pmatrix} e^{i\phi_1}\cos\theta \cos\epsilon - ie^{i\phi_1}\sin\theta \sin\epsilon \\ e^{i\phi_2}\sin\theta \cos\epsilon + ie^{i\phi_2}\cos\theta \sin\epsilon \end{pmatrix} \quad (A.7)$$

$$= \begin{pmatrix} \cos\phi_1 \cos\theta \cos\epsilon + \sin\phi_1 \sin\theta \sin\epsilon + i[\sin\phi_1 \cos\theta \cos\epsilon - \cos\phi_1 \sin\theta \sin\epsilon] \\ \cos\phi_2 \sin\theta \cos\epsilon - \sin\phi_2 \cos\theta \sin\epsilon + i[\sin\phi_2 \sin\theta \cos\epsilon + \cos\phi_2 \cos\theta \sin\epsilon] \end{pmatrix}$$

$$= \begin{pmatrix} \cos\epsilon' \\ i\sin\epsilon' \end{pmatrix} \quad (A.8)$$

where $$\tan\epsilon' = \frac{\sin\phi_2 \sin\theta \cos\epsilon + \cos\phi_2 \cos\theta \sin\epsilon}{\cos\phi_1 \cos\theta \cos\epsilon + \sin\phi_1 \sin\theta \sin\epsilon} \quad (A.9)$$

$$= \left[ \frac{\tan^2\theta + \tan^2\epsilon}{1 + \tan^2\theta \tan^2\epsilon} \right]^{\frac{1}{2}}$$

PROVIDED THAT:

$$\sin\phi_1 \cos\theta \cos\epsilon = \cos\phi_1 \sin\theta \sin\epsilon \text{ i.e. } \tan\phi_1 = \tan\theta \tan\epsilon \quad (A.10)$$

$$\cos\phi_2 \sin\theta \cos\epsilon = \sin\phi_2 \cos\theta \sin\epsilon \text{ i.e. } \tan\phi_2 = \tan\theta \cot\epsilon \quad (A.11)$$

Notes (i) The equations for $\phi_1$ and $\theta_2$, (A.10) and (A.11), are always soluble.

(ii) Premultiplication of the vector (A.1) by the matrix (A.2) obviously leads directly to (A.7). However, the digression via (A.3) to (A.6) illuminates the polarisation conversion problem, and in particular the need for a stack of two cells.

(B) Cell 3

Let the Jones matrix of cell 3 be written $$\begin{pmatrix} e^{i\phi_3} + e^{i\phi_3 - 1} \\ e^{i\phi_3} - e^{i\phi_3 + 1} \end{pmatrix} \quad (A.12)$$

Then $$\begin{pmatrix} e^{i\phi_3} + e^{i\phi_3 - 1} \\ e^{i\phi_3} - e^{i\phi_3 + 1} \end{pmatrix} \begin{pmatrix} \cos\epsilon' \\ i\sin\epsilon' \end{pmatrix} = \begin{pmatrix} e^{i(\phi_3 + \epsilon')} + e^{-i\epsilon'} \\ e^{i(\phi_3 + \epsilon')} - e^{-i\epsilon'} \end{pmatrix} \quad (A.13)$$

$$= \begin{pmatrix} \cos(\frac{1}{2}\phi_3 + \epsilon') \\ i\sin(\frac{1}{2}\phi_3 + \epsilon') \end{pmatrix} \quad (A.14)$$

Evidently the final output is, in general, a beam with azimuth=0 and ellipticity angle $\frac{1}{2}\phi_3+\epsilon'$, i.e. arbitrary to known azimuth conversion. The condition for conversion to linear polarisation is $$\tfrac{1}{2}\phi_3 + \epsilon' = \tfrac{1}{2}n\pi (n = 0, \pm 1, \pm 2, \ldots) \quad (A.15)$$

In order to convert linearly polarised light into arbitrary polarisation, the stack of cells 1, 3 shown in FIG. 1 is operated in precisely the reverse of that described above. Linearly polarised light is incident with its plane of polarisation inclined at 45° to the slow axis 5 of the first cell 1, thereby achieving conversion to elliptical polarisation with principal axes parallel and perpendicular to the slow axis 7 of the second cell 3. Conversion to the desired azimuth and ellipticity is then completed by the second cell 3.

The mathematical algorithm for this reverse conversion follows from the observation that the Jones matrices A2 and A12 have inverses.

It will be evident that by changing the signal applied to the cell 3 the configuration shown in FIG. 1 may be used to convert arbitrary polarisation to elliptical polarisation with fixed principal axes.

It will be appreciated that whilst the polariser described herebefore by way of example incorporates two homogeneously aligned nematic liquid crystal cells, the polariser may equally include liquid crystal cells of alternative alignments. Referring now to FIGS. 5 and 6, the cells 1, 3 may alternatively incorporate a nematic liquid crystal film having a homeotropic alignment.

In such a device both plates 11, 13 will bear alignment layers of a type which cause the optic axis of the liquid crystal to align perpendicular to, or tilted at a small angle to the perpendicular to, the plate. The latter arrangement is preferred since it resolves a degeneracy which might otherwise cause formation of domains when an electric field is applied across the cell. Preferred alignment layers include surfactants (which impart perpendicular alignment) or surfactants applied over obliquely evaporated silicon monoxide films of the type which alone would give 30° tilt (the surfactants thus imparting a tilt to perpendicular alignment). As shown in FIG. 5, each cell is assembled with the alignment directions 30 antiparallel so that in the absence of an applied voltage the optic axis in the bulk of the liquid 32 adopts a uniform configuration throughout the cell. Thus on application of an AC voltage to the cell if the liquid crystal has a negative dielectric anisotropy the configuration of the optic axis becomes distorted as shown in FIG. 5. As a result the phase retardation between ordinary and extraordinary rays transmitted normally through the birefringent cell varies with RMS applied voltage V as shown in FIG. 6.

A further alternative alignment for the cells 1, 3 is a hybrid alignment in which one plate bears an alignment layer of homogeneous type while the other bears a layer of homeotropic type. The liquid crystal may have either positive or negative dielectric anisotropy. On application of an AC voltage to the cell the phase retardation between ordinary and extraordinary rays transmitted normally through the birefringent cell will decrease in the former case and increase in the later case, as shown in FIGS. 7 and 8 respectively.

Yet a further alternative alignment for the cells 1, 3 is a hybrid alignment in which one plate bears an alignment layer of homogeneous type in which the optic axis makes a particular angle with the plate while the other bears an alignment layer of homogeneous type in which the optic axis makes a different angle with the plate, the cell being assembled with the alignment directions antiparallel.

It will be appreciated that each cell 1, 3 within the above controller may include a liquid crystal having any one of the above alignments, i.e. homogeneous, homeotropic or hybrid.

It will also be appreciated that the two cells, 1, 3 may be separated by a single glass plate with electrode and alignment layers applied to both sides, or may be fabricated from two plates joined with optical cement.

It will be appreciated that a particular advantage of a polarisation controller in accordance with the first aspect of the invention is that the maximum phase retardation of each liquid crystal cell within the controller is given by the expression $$\delta = 2\pi d(n_e - n_o)/\lambda$$

where d, $n_e$, $n_o$ are, respectively, the thickness of the liquid crystal film and its extraordinary and ordinary refractive indices, and $\lambda$ is the wavelength of the incident light. Since $(n_e - n_o)$ may be as high as 0.2 or more $\delta$ values of $4\pi$ radians or greater are attainable with typical values of d and $\lambda$. A $\delta$ range of at least $3\pi$ radians may be necessary.

It will also be appreciated that the threshold voltages $V_o$ shown in FIGS. 4 and 6 typically lie in the range one to three volts. Thus the operating voltage of a controller in accordance with the invention will be typically 2 to 4 volts.

It will also be appreciated that the optical path through each liquid crystal layer in a controller in accordance with the invention will be short, typically a few $\mu$m. With proper attention to antireflection coatings insertion losses will therefore be very small, typically fractions of a dB per liquid crystal layer, and the power required to operate the controller will be in the microwatt range. The thickness and relative refractive indices of layers used in the construction of the controller may be chosen such that interference effects serve to reduce insertion losses. Alternatively, interference effects may be reduced or eliminated by use of layers of wedged shape.

It will be realised that whilst the liquid crystal cells described above by way of example incorporate liquid crystal films of between 5 $\mu$m and 10 $\mu$m thickness, thinner films may be used with appropriate materials in order to obtain particularly fast response time.

It will also be realised that polarisation controllers in accordance with the first aspect of the invention may be free space devices, or they may be fabricated integral with source or detector devices, or may be incorporated into integrated optical devices.

It will be obvious that an arbitrary to linear controller followed by a linear to arbitrary controller can function as an arbitrary to arbitrary controller, provided that the output polarisation of the arbitrary to linear controller coincides with the input polarisation of the linear to arbitrary controller. However, such a controller needs a total of 4 liquid crystal cells of any combination of homogeneous, homeotropic and hybrid alignments.

The second controller to be described functions as an arbitrary to arbitrary controller using only three cells 90, 92, 94 as shown in FIG. 9, each cell being of the form as described in relation to the first controller. The beam of light 912 with arbitrary polarisation 914 is converted by the first cell 90 into a beam with elliptical polarisation 916 with principal axes parallel and perpendicular to the slow axis 96 of the cell 90. The second and third cells 92 and 94 then act as a known-azimuth to arbitrary convertor as described above in relation to the first controller. The cell 92, having its slow axis 98 inclined at ±45° to the axis 96, changes the ellipticity but not the azimuth of the incident radiation 912 and the third device 94, the slow axis 910 of which is either parallel or perpendicular to the axis 96 the former being shown in FIG. 9, completes the conversion to the desired output polarisation 920.

Figure 10:
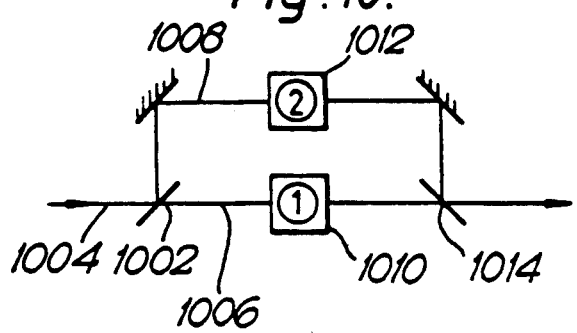
FIG. 10 is a schematic diagram of the third controller.
Figure 11:
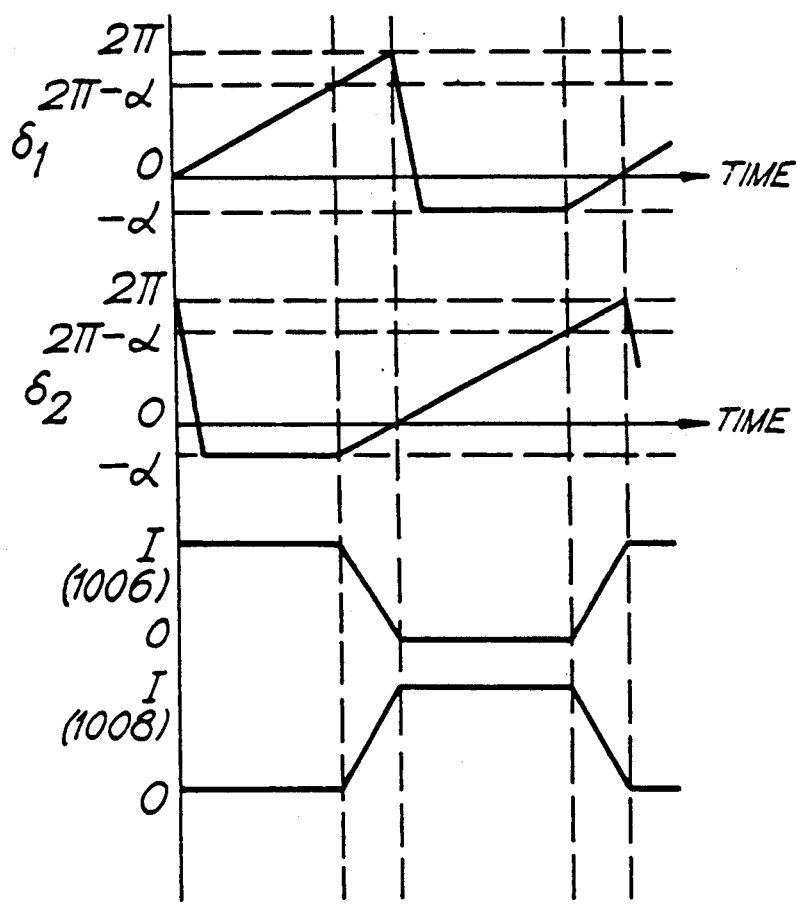
FIG. 11 illustrates the variation of the phase retardations produced by the controller of FIG. 10 with time.

Turning now to FIGS. 10 and 11, a problem which may arise in the application of polarisation controllers to optical communications systems is that the input polarisation may vary monotonically without limit. However, the corresponding phase retardations which can be generated by the individual devices forming the controller are all limited. Thus, no matter what the design of the controller, a point will eventually be reached where one or more of the component devices will have to be "reset", i.e. its phase retardation changed by a multiple of $2\pi$, or in some instances optionally $\pi$. Unfortunately, this reset operation takes a finite time and measures must be taken to ensure that data is not corrupted or lost while resetting.

This problem can be overcome by the third controller to be described, which is illustrated in FIG. 10. The third controller comprises a routing device 1002 effective to route an incoming beam 1004 the polarisation of which it is sought to control partly or entirely into two alternative paths 1006, 1008. Each path 1006, 1008 contains a respective stack of liquid crystal cells 1010, 1012 each of the general form described hereinbefore in relation to either the first or second controller. A recombining device 1014 effective to combine the two paths 1006, 1008 is also provided.

Referring now also to FIG. 11, where $\delta_1$ represents the phase retardation produced by a particular cell in the stack 1010, and $\delta_2$ represents the phase retardation produced by the corresponding cell in the stack 1012, in use of the controller the routing device is initially arranged such that the incoming light is routed exclusively along the path 1006, i.e. the intensity I (1008) of the light transmitted along the path 1008 is zero as indicated in FIG. 11. The phase retardation produced by the cell in the stack 1010 is arranged to increase until it approaches within an amount $\alpha$ of a convenient unit which here is taken to be $2\pi$, the cell in the stack 1012 being set such that it imposes a phase retardation of $-\alpha$, i.e. the same modulo $2\pi$. The routing device 1002 is now arranged to fade the beam 1004 out of the path 1006 and into the path 1008, the overall intensity I (1008) plus I (1006) of course being a constant.

The whole procedure is then repeated with the beam 1004 being entirely routed along the path 1008 etc. and so on as indicated in FIG. 11.

It will be evident that the switching and fading between the optical paths 1006, 1008 can be accomplished with a variety of devices. Thus FIG. 10, and in particular the routing device 1002 and the recombining device 1014, are to be thought of as schematic and illustrative of the principle involved. In practice, both optical switches and/or variable attenuators, which may be separate devices or incorporated with each other, or in the case of attenuators associated with the stacks 1010 and 1012, may be used. All these devices will be under the control of control circuitry not shown in FIG. 10.

It will be evident also that the routing and fading devices may themselves introduce changes in the polarisation of the beam. If these changes are unsymmetrical between branches 1 and 2 then the simple relationship between $\delta_1$ and $\delta_2$ shown in FIG. 11 will be modified.

Figure 12:
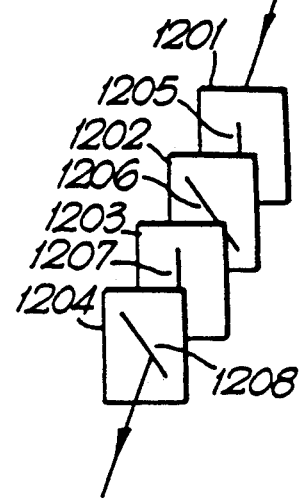
FIG. 12 is a schematic diagram of the fourth controller.

This problem can alternatively be overcome by the fourth controller illustrated in FIG. 12. The fourth controller comprises four cells 1201, 1202, 1203, 1204 in which the slow axes 1205, 1207 of the first and third cells are parallel and perpendicular and the slow axes of the second and fourth cells 1206, 1208 are oriented at ±45° to the axis of the first cell. Algorithms for the control of such a controller will be readily understood by those skilled in the art from the algorithms published for fibre squeezer devices.

Although in the above embodiments the cells are controlled by electric fields applied thereto, alternatively the cells may be magnetically controlled.

What is claimed is:

1. A polarisation controller comprising: at least one stack of nematic liquid crystal cells arranged such that radiation incident on the stack will pass through each cell in the stack in sequence; and means for applying synchronized fields across the cells so as to change the phase retardation of the radiation transmitted through each cell by a chosen amount, the optical axes of the cells being oriented with respect to each other, such that the polarisation of radiation transmitted through the controller is changed from a first polarisation state in which the radiation impinges upon the controller to a second polarisation state in which the radiation leaves the controller, one of said states being a first arbitrary polarisation and the other of said states being a pre-selected fixed polarisation or a second arbitrary polarisation; said means for applying synchronized fields including feedback means effective to change the values of said fields dependent on said second state.

2. A controller according to claim 1 for use where said first and second polarisations are both arbitrary states, each stack comprising three liquid crystal cells, the slow axes of the first and last liquid crystal cells within each stack being either perpendicular or parallel to each other, the slow axis of the intermediate liquid crystal cell being inclined at an angle of substantially ±45° to the slow axis of the first cell.

3. A controller according to claim 1 for use where said first state is a continuously varying arbitrary polarisation, the controller comprising a stack of four of said nematic liquid crystal cells, the slow axes of the first and third cells within the stack being either parallel or perpendicular to each other, and the slow axes of the second and fourth cells being inclined at an angle of substantially ±45° to the slow axis of the first cell.

4. A controller according to claim 1, wherein each said field is an electric field.

5. A controller according to claim 1, wherein the phase retardation range of each cell is at least $3\pi$ radians.

6. A controller according to claim 1, for use where said one state is an arbitrary elliptical polarisation and said other state is a linear polarisation of known azimuth; and wherein each stack comprises two of said liquid crystal cells arranged with their slow axes set at substantially 45° with respect to each other.

7. A polarisation controller comprising: two stacks of nematic liquid crystal cells arranged such that radiation incident on each stack will pass through each cell in the stack in sequence, said stacks constituting two alternative optical paths; means for applying synchronized fields across the cells so as to change the phase retardation of the radiation transmitted through each cell by a chosen amount, the optical axes of the cells being oriented with respect to each other, such that the polarisation of radiation transmitted through the controller is changed from a continuously varying first polarisation state in which the radiation impinges upon the controller to a second polarisation state in which the radiation leaves the controller, one of said states being a first arbitrary polarisation and the other of said states being a pre-selected fixed polarisation or a second arbitrary polarisation; and means for varying both the proportions of said incident radiation passing along each path and the phase retardation produced by each stack in a periodic manner.

* * * * *